Jan. 12, 1943.  J. B. BRENNAN  2,308,234
INSTRUMENT CONTROL
Filed Jan. 6, 1941

INVENTOR.
JOSEPH B. BRENNAN
BY
Oberlin, Limbach & Day.
ATTORNEYS

Patented Jan. 12, 1943

2,308,234

UNITED STATES PATENT OFFICE 2,308,234

INSTRUMENT CONTROL

Joseph B. Brennan, Cleveland, Ohio

Application January 6, 1941, Serial No. 373,329

4 Claims. (Cl. 33—204)

This invention relates as indicated to instrument control devices and more specifically to an improved method of and apparatus for the energization of gyroscopically controlled instruments.

As is well-known to those familiar in the art, gyroscopically controlled instruments as are used in present day aircraft have the gyroscopic element impelled by a fluid such as air which is caused to circulate by means of a pump through the casing housing the gyroscopic element and the instrument dial associated therewith.

Certain difficulties have been encountered in the operation of instruments of the character described. Moisture entrained in the fluid stream employed to impel the gyroscope element, as well as oil entrained in such stream as a result of having become separated from the vanes of the pump lubricated thereby, have condensed out of such stream of impelling fluid in the casing housing the gyroscope and accordingly interfering with the operation of the instrument and fogging the sight or transparent opening over the face of the instrument.

Variations in barometric pressure, occasioned by normal fluctuation in such pressure at a given elevation, and by a change in elevation of the craft carrying the instrument, have resulted in variations in the stream of impelling fluid accompanied by variations in speed of operation of the gyroscopic element impelled thereby.

Similarly, variations in temperature, occasioned by natural variations at a given elevation or incidental to variations encountered in moving from one elevation to another, have had disturbing influence on the stream of impelling fluid accompanied by variations in the operation of the fluid impelled instrument.

It is a principal object of my invention to provide a method of and apparatus of the character described which is not sensitive to these variables, and which, therefore, operates in a more constant fashion than the prior art devices. Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
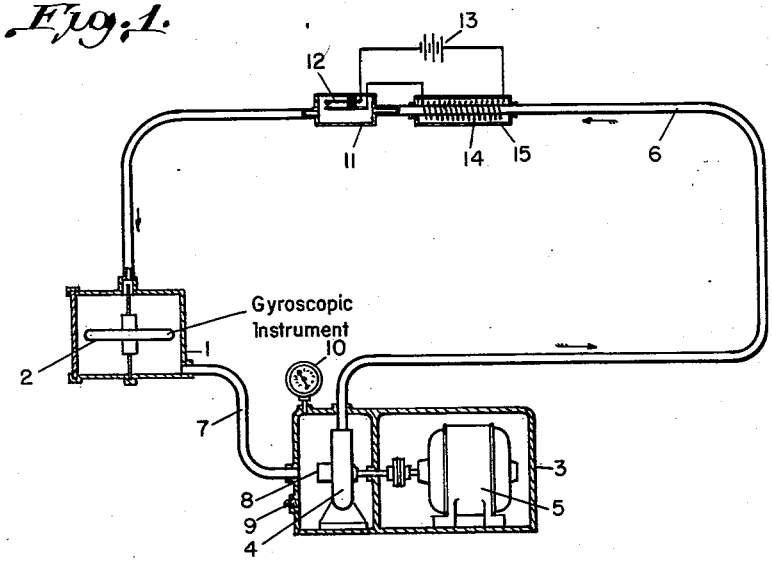

In said annexed drawing, Fig. 1 is a diagrammatic representation of one embodiment of the principles of my invention.

Figure 2:
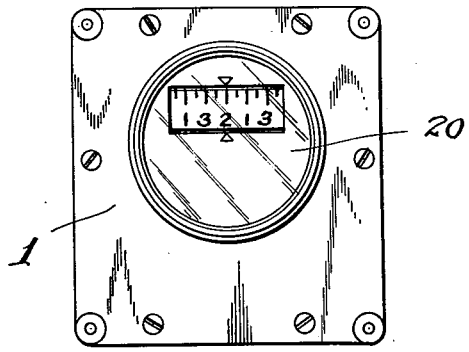

Fig. 2 is a face view of the gyroscopic instrument.

In Figure 2 I have shown a sight face 20 similar to conventional sight faces as shown in the following patents: Carter, 2,086,896 issued July 13, 1937—particularly Fig. 3; Carlson 1,982,635 issued Dec. 4, 1934—particularly Fig. 1.

In Fig. 1, the ordinal 1 denotes a first casing which houses a fluid impelled instrument such as a gyroscope diagrammatically illustrated at 2. A second casing 3 houses a fluid impelling device 4 and a prime mover 5. Suitable conduits 6 and 7 interconnect the casing 1 and 3 and form therewith a closed or sealed system, it being observed that the casings 1 and 3 are sealed against the atmosphere.

The gyroscopic instrument 2, housed in the casing 1, may be any conventional gyroscopic instrument, such as a turn and bank indicator commonly used on airplanes. Since the details of construction of such instruments are well-known, and since they form no part of the present invention, a detailed showing thereof has been omitted from the drawing in the interests of simplification. It will be observed that a stream of fluid circulated by the impelling means 4 is caused to flow through the conduit 6 and by impingement against, or circulation through, the gyroscopic instrument will actuate the same in the conventional manner, such fluid being returned to the casing 3 and the fluid impelling means 4 contained therein by means of the return conduit 7. The inlet port for the fluid impelling means 4 is indicated at 8, and the outlet port over such fluid impelling means as the conduit 6 connected therewith.

The fluid impelling means 4 is preferably a centrifugal fan or pump since this type of impeller does not require the presence of a lubricant such as oil on any surface with which the impelled fluid stream comes in contact. The prime mover 5 may be any suitable power means, a small electric motor being diagrammatically illustrated for purposes of convenience.

The casing 3 is, as previously indicated, sealed against the atmosphere. This is accomplished by means of solid connections between the conduits 6 and 7 and such casing, and by leading the power supply lines (not shown) in a conventional manner by means of solid connections through the walls of such casing to the prime mover 5. A removable filler plug 9, set in a wall of the casing 3, may be utilized in filling the entire sealed system with a suitable fluid, preferably at a pressure substantially higher than atmospheric at sea level. A pressure on the order of about thirty pounds per square inch will be found satisfactory. A pressure gauge 10, connected with the interior of the casing 3, serves to indicate the pressure condition within the system.

The fluid employed to fill the system is preferably gaseous and preferably inert. Care should be exercised in the selection of such fluid and in its introduction into the system, that no entrained moisture will be present which might condense on the sight face 20 of the gyroscopic instrument. If reasonable care is exercised in filling the system with a dry fluid and the system then sealed, all danger of condensation on, and fogging of, the sight face 20 of the instrument will be avoided. An inert gaseous fluid, such as nitrogen, sulphur dioxide and the like may be advantageously employed.

With the entire system sealed against the atmosphere, the operation of the gyroscopic instrument is not subject to any of the fluctuations incidental to variations in barometric pressure of the atmosphere surrounding the craft on which the instrument is mounted. In order to eliminate any fluctuations, due to change in temperature, I provide an auxiliary casing 11 in one of the conduits in which is mounted a thermostat 12. The thermostat 12 is effective, either directly or through a relay, to close the circuit from a source of electrical energy diagrammatically represented at 13 through a heating coil 14 surrounding one of the conduits and housed in a suitable casing 15. By setting the thermostat so as to maintain the fluid within the system at the maximum ground temperature, such temperature will be maintained at all times and fluctuations in the pressure within the system, and consequent fluctuations in the operation of the gyroscopic instrument impelled by the stream of fluid, accordingly avoided.

From the foregoing, it will be observed that I have provided a novel method of and means for impelling gyroscopic instruments, the same being characterized by an avoidance of the previously enumerated disadvantages of the prior art.

Other modes of applying the principle of the invention may be employed, change being made as regards the details described, provided the features stated in any of the following claims or the equivalent of such be employed.

I, therefore, particularly point out and distinctly claim as my invention:

1. In apparatus of the character described, the combination of a casing containing a fluid impelled rotor and having a sight face, with a fluid impelling means, and means interconnecting said casing and said fluid impelling means to form a closed system, sealed from the atmosphere, whereby condensation upon said sight face is prevented.

2. In apparatus of the character described, the combination of a casing containing a fluid impelled rotor and having a sight face, with a fluid impelling means, and means interconnecting said casing and said fluid impelling means to form a closed system, sealed from the atmosphere, whereby condensation upon said sight face is prevented, said system being completely filled by a fluid under greater pressure than atmospheric.

3. In apparatus of the character described, the combination of a casing containing a fluid impelled rotor and having a sight face, with a fluid impelling means, and means interconnecting said casing and said fluid impelling means to form a closed system, sealed from the atmosphere, whereby condensation upon said sight face is prevented, said system being completely filled by a fluid and means for maintaining substantially constant the temperature of said fluid.

4. In apparatus of the character described, the combination of a casing containing a fluid impelled rotor and having a sight face, with a fluid impelling means, and means interconnecting said casing and said fluid impelling means to form a closed system, sealed from the atmosphere, whereby condensation upon said sight face is prevented, said fluid impelling means comprising a motor and a fluid impeller, said motor being mounted in a casing sealed from said impeller.

JOSEPH B. BRENNAN.